TOTAL RELEASED HEAT vs TIME

RELEASE HEAT, CALORIES X $10^{-16}$

TIME, YEARS X $10^{-1}$

POWER OUTPUT

MEGAWATTS

TIME, YEARS X $10^{-1}$

Dec. 19, 1972   J. J. COHEN ET AL   3,706,630
NUCLEAR CHIMNEY RADIOACTIVE WASTE DISPOSAL
Filed May 12, 1971   5 Sheets-Sheet 5

United States Patent Office 3,706,630
Patented Dec. 19, 1972

3,706,630
NUCLEAR CHIMNEY RADIOACTIVE WASTE DISPOSAL
Jerry J. Cohen, Livermore, and Arthur E. Lewis, Los Altos, Calif., assignors to the United States of America as represented by the United States Atomic Energy Commission
Filed May 12, 1971, Ser. No. 142,715
Int. Cl. G21f 9/24
U.S. Cl. 176—87                                                  11 Claims

ABSTRACT OF THE DISCLOSURE

Aqueous fluidic forms of radioactive wastes are introduced into lower portions of a nuclear chimney wherein water is vaporized therefrom by radioactive decay heat and concentrated wastes are accumulated therein. High level wastes, low level wastes including particulates filtered from the steam and portions of the condensed steam serving as a coolant are introduced over an extended period of time in amounts proportioned to maintain chimney contents at a low temperature level. When sufficient wastes have accumulated input of coolant and radioactive waste is terminated and the cavity may be sealed after vapor output terminates. Radioactive heat output then is employed to melt the chimney contents and rock adjacent to the chimney portions so as to incorporate the radioactive materials into the molten rock. After radioactive heat output diminishes to a level insufficient to offset heat diffusion into the formation the molten mass solidifies permanently trapping the residual radioactivity in an insoluble matrix.

BACKGROUND OF THE INVENTION

The invention described herein was made in the course of, or under, Contract No. W-7405-ENG-48 with the United States Atomic Energy Commission.

In the past, many methods for permanently disposing of the radioactive wastes of nuclear reactors and nuclear reactor fuel reprocessing operations have been studied and employed. These methods include tank storage, liquid storage in tunnels mined in crystalline bedrock, storage of solidified wastes in underground caves mined in salt, etc. An extensive discussion of such prior art waste disposal methods is presented in a report, ORNL-4451, entitled "Siting of Fuel Reprocessing Plants and Waste Management Facilities" prepared by the Oak Ridge National Laboratories. The utilization of nuclear chimneys as receptacles for radioactive wastes has also been suggested for a configuration where the chimney, upon filling, is simply closed off and sealed (c.f. Australian Atomic Energy Commission Report No. A AEC (SP)/R1, issued Sydney, March 1964). However, in such procedures the radioactive wastes remain in a fluid form which could escape from the chimney, the heat of radioactive decay is not recoverable, and other difficulties are attendant thereon. A need exists for improved procedures for disposing of radioactive wastes.

SUMMARY OF THE INVENTION

The present invention relates, generally, to procedures for disposing of radioactive waste material, and, more particularly, to an improved process for disposing of radioactive wastes in a nuclear chimney wherein the energy of radioactive heat may be recovered and the radioactive wastes are immobilized.

A nuclear explosive is emplaced in an impermeable silicate rock formation and detonated to form a nuclear chimney partially filled with rubble. Thereafter, vapor output and fluid input conduits, e.g., wellbores are drilled or are otherwise provided to establish communication, respectively, with the top of the chimney and to intermediate peripheral sections of the chimney. In the first phase of operation of the process, radioactive wastes in a fluidic form, i.e., as an aqueous solution or as a slurry of particulate material in water are introduced through the input conduit into the nuclear chimney, i.e., into the rubble zone therein. The radioactivity level of the wastes are regulated to assure that the radioactive heat output is sufficient to heat chimney contents and the introduced material above the vaporization point of the water medium.

The vapor, i.e., steam produced thereby which may contain radioactive waste particles, non-condensible radioacitve materials, radiolytic products and vaporized solution components is withdrawn upwardly through the rubble zone in which at least some of particulate portions, spray particles and other components are filtered therefrom and refluxed back into lower portions of the chimney. After passage through the rubble zone the steam is withdrawn to the surface, particulate solid and gaseous contaminants are separated and the steam is condensed for recycle or disposal in a fashion appropriate to the composition thereof. Regulation of the vapor discharge pressure and of the rate of introduction of coolant and diluted radioactive wastes will generally control operating temperatures in the chimney.

The radioactive wastes may usually be introduced over an extended period of time as they are produced in the normal course of operation of a nuclear fuel reprocessing plant so as to avoid the necessity for a large temporary surface high level radioactive waste storage facility. A relatively large quantity of high level waste may be introduced initially, to establish a desired operating temperature level. Thereafter, high level waste, low level wastes and recycle condensed coolant water, which may contain radioactive material separated in the surface facility are introduced in amounts regulated to assist in maintaining the chimney contents at the desired operating temperature level. Introduction of the indicated materials is continued until a predetermined or selected quantity of concentrated radioactive waste residue is accumulated in void spaces of the rubble zone in the chimney.

Eventually, in a second phase of operation, when the ultimate capacity of the nuclear chimney is achieved or it is otherwise desired to terminate operation thereof, introduction of the various wastes and coolant water is terminated. Radioactive heat output then gradually increases the temperature of the chimney contents vaporizing residual water and other volatiles if present which vaporized material also may be withdrawn as described above. The quantity of radioactive waste introduced into the chimney should be sufficient to compensate for the decrease in radioactive heat output with passage of time and to assure that the radioactive heat output exceeds that lost by conduction to the formation so as to be sufficient to increase the temperature sufficiently to melt the rubble to eventually form a molten mixture with the radioactive waste components. The quantity of radioactive wastes may be in excess of that required to melt the chimney contents and sufficient to melt rock adjacent to the chimney walls. As the melt volume increases, its surface area increases and heat loss by conduction increases so that the melting process is self-limited at the point where such loss balances the radioactive heat output. When vapor output from the molten mixture has substantially ceased, to instigate a third phase of operation of the process, the input and output conduits may be sealed. Once the heat balance limit described above is achieved, a gradual cooling of the molten chimney contents occurs since the radioactive heat output decreases as the radioactive species therein decay. Eventually, in the fourth phase of operation, the molten mass solidifies as cooling progresses so that the residual radioactive materials are entrapped in an insoluble solidified silicate rock matrix.

Accordingly, it is an object of the present invention to provide an improved process for using a nuclear chimney for radioactive waste disposal.

It is also an object of the present invention to provide a nuclear chimney radioactive waste disposal process by which the energy released by decaying radioactive materials may be safely recovered or dissipated.

It is a further object of the present invention to provide a nuclear chimney radioactive waste disposal process wherein radioactive wastes are permanently isolated from the biosphere.

Other objects of the present invention not specifically set forth above will be apparent to those skilled in the art in the following description and accompanying drawings.

DETAILED DESCRIPTION

Figure 1:
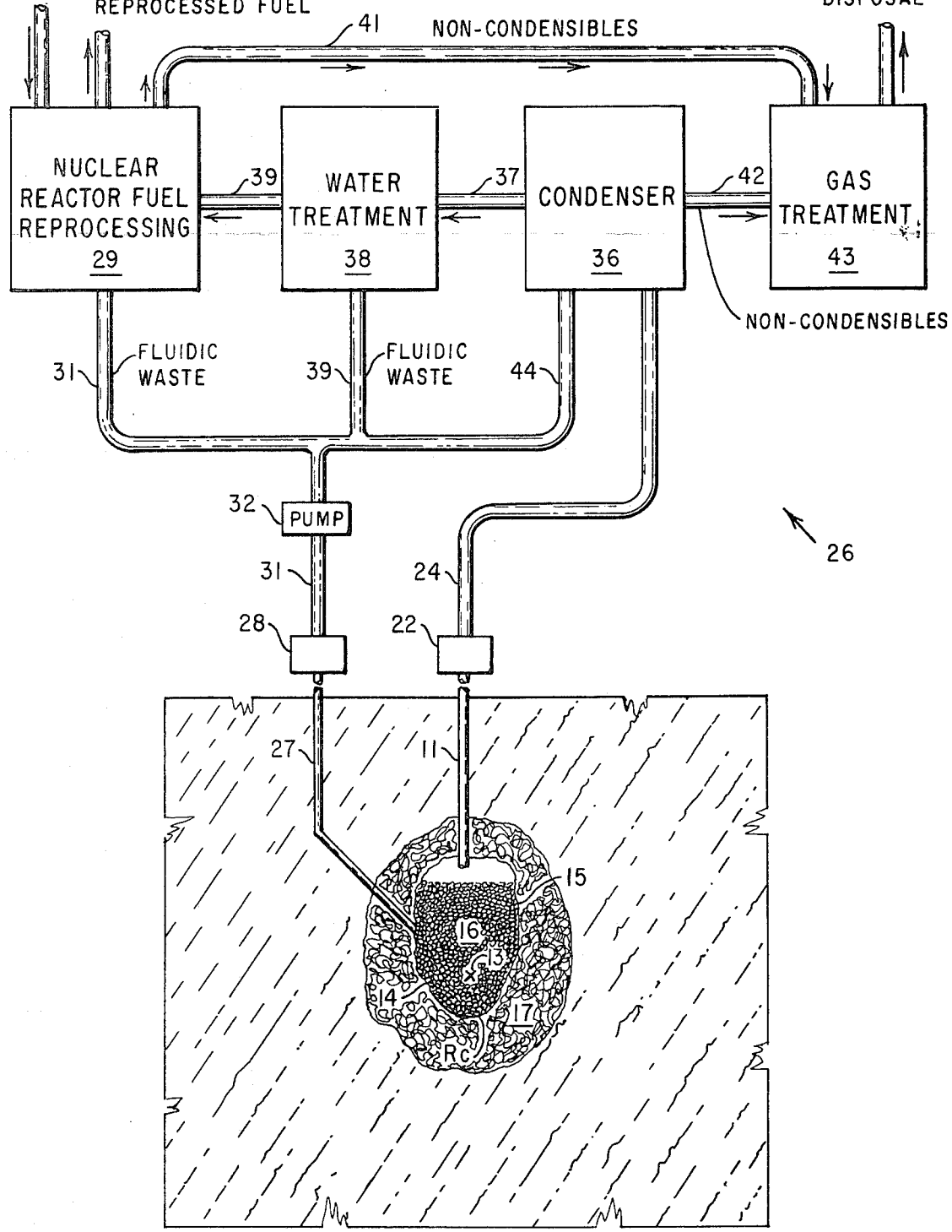
FIG. 1 is a vertical sectional view of a subterranean formation provided with a nuclear chimney and with accessory surface facilities in which radioactive wastes may be disposed in accordance with the invention.

During reprocessing of spent nuclear reactor fuel elements for recovering fissionable material or radioactive nuclides therefrom, the cladding of the fuel element may be sheared therefrom or the cladding as well as the fissionable fuel, fertile breeder material portions, etc., may be removed by various procedures in which solutions thereof are produced. After extraction of desired components therefrom undesired highly radioactive fission products and materials in which radioactivity has been induced remain in the residual process solutions or in solid wastes. Such solutions, particularly those obtained in processing spent fuel and fertile materials, represent a high level radioactive waste product which is presently stored in expensive cooled shielded underground containers as described in the aforesaid report ORNL–4451. The original composition of the waste solutions is dependent on several factors such as fuel and fertile material composition, type of reactor, burnup rate, neutron flux, length of the time of storage and others known in the art.

High level wastes can contain a wide variety of fission products in proportions dependent on length of storage. In other cases the high level of radioactivity may be due to significant residual amounts of particular isotopes such as $Sr^{90}$ and $Cs^{137}$. Relatively low level radioactive wastes may be produced where the radioactive materials, e.g., fission products are highly diluted with non-radioactive substances or by evaporation of solvents from high level solutions stored for a time period permitting decay of the more rapidly radioactively decaying materials. The following table, which is excerpted from page 4–31 of said ORNL–4451, discloses the composition of high level liquid wastes derived from three typical fuel processing operations.

TABLE 1.—RANGE OF CHEMICAL COMPOSITIONS OF HIGH-LEVEL LIQUID WASTES

| Constituent | Concentration (M at 378 liters/metric ton) for waste composition | | |
|---|---|---|---|
| | No. 1 | No. 2 | No. 4 |
| A. General chemical composition of inert materials | | | |
| Na | Low | (¹) | Low |
| Fe | (¹) | Medium | Low |
| Al | 0 | 0 | 0 |
| SO₄ | 0 | (¹) | 0 |
| B. Actual chemical composition of inert materials | | | |
| H | 3.7 | 3.93 | 6.29 |
| Fe | 0.93 | 0.445 | 0.05 |
| Cr | 0.102 | 0.024 | 0.012 |
| Ni | 0.005 | 0.010 | 0.008 |
| Al | 0.001 | 0.001 | 0.001 |
| Na | 0.138 | 0.93 | 0.10 |
| U | 0.010 | 0.010 | 0.010 |
| Hg | <0.001 | <0.001 | <0.001 |
| NO₃ | 7.5 | 5.37 | 6.66 |
| SO₄ | | 0.87 | |
| PO₄ | 0.003 | 0.006 | 0.003 |
| SiO₃ | 0.010 | 0.010 | 0.010 |
| F | <0.001 | <0.001 | <0.001 |
| ΣM⁺$_{chem}$ ª | 3.03 | 2.48 | 0.365 |
| Kg. oxide/metric ton | 31.7 | 28.1 | 4.6 |

| | C. Chemical composition of major materials from nuclear fission, fuel exposure in thermal reactors | |
|---|---|---|
| | 20,000 mwd./metric ton at 15 mw./metric ton | 45,000 mwd./metric ton at 30 mw./metric ton |
| Mo | 0.065 | 0.130 |
| Tc | 0.014 | 0.031 |
| Sr | 0.0155 | 0.036 |
| Ba | 0.0195 | 0.041 |
| Cs | 0.035 | 0.078 |
| Rb | 0.007 | 0.014 |
| Y+RE ᵇ | 0.12 | 0.274 |
| Zr | 0.065 | 0.143 |
| Ru | 0.032 | 0.082 |
| Rh | 0.0074 | 0.013 |
| Pd | 0.017 | 0.043 |
| Ag | 0.0008 | 0.0016 |
| Cd | 0.0008 | 0.0025 |
| Te | 0.0064 | 0.014 |
| ΣM⁺$_{fp}$ ª | 0.91 | 2.11 |
| Kg. oxide/metric ton | 22 | 49 |

¹ High.
ª M⁺ is metal equivalents, or normality of metal ions (does not include acid).
ᵇ RE are rare earth elements.

Waste composition No. 1 is typified by a very high content of iron and a low content of other constituents. This waste has been generated by one reprocessor by dissolving an iron fuel container with the fuel. Composition No. 2 is a moderately "dirty" waste from first-cycle waste combined with second-cycle waste that contains sulfate (which comes from a reductant in the uranium-plutonium partitioning step). Waste No. 4 is a "clean" waste, which would come from the first-solvent extraction cycle if reasonable care is taken to maintain a flow-sheet reasonably free of non-radioactive chemicals. This is expected to be a fairly typical waste in the near future. Wastes having composition Nos. 1, 2, and 4 bracket the range of expected high-level liquid waste compositions.

The third part of Table 1 shows the amounts of fission product elements resulting from fissioning in thermal reactors with moderate and high-exposure histories. The 20,000-mwd./metric ton exposure is typical of current reactors, and the 45,000 mwd./metric ton exposure represents probable maximum exposures in future thermal reactors. It is obvious that, unless intermediate-level wastes from fuel reprocessing are mixed with the high-level wastes, the chemical content of fission products will be significant in essentially all fuel reprocessing schemes. In fact, with moderate attempts to minimize the inert contaminants in the waste, the chemical equivalents of fission products will exceed those of the non-fission products, and the chemistry of the fission products will be the controlling factor in the waste treatment steps.

Another point of interest is that the absolute minimum volume of solidified waste (that of fission product oxides alone) is about 1 cubic foot per 10,000 mwd. Contributions from the inert chemicals in the compositions shown in Table I can increase that volume by a factor up to about 4.

Activity level definitions for low, intermediate and high level radioactive wastes are set forth in Table 2 infra.

TABLE 2

| Level | ORNL | | Hanford, $\mu c.i./ml.$ | AICE,[1] XMPC |
|---|---|---|---|---|
| | $\mu c.i./ml.$ | XMPC | | |
| Low | $10^{-5}$—$10^{-2}$ | 10—$10^4$ | $<5\times10^{-5}$ | $<10^4$ |
| Intermediate | $10^{-2}$—1 | $10^4$—$10^6$ | $5\times10^{-5}$—100 | $10^4$—$10^8$ |
| High | $>1$ | $>10^6$ | $>100$ | $>10^8$ |

[1] Am. Inst. of Chem. Eng.

As may be seen the definitions from various sources vary somewhat but the indicated values can be considered representative of the relative radioactivity levels which are encountered.

For practicing the process of the invention, the selection of a suitable subterranean formation is important. Thick, impervious formation intervals of an appropriate composition that are adequately isolated from aquifers or the surface environment are basic requirements. For providing the desired insoluble matrix in which the radioactive wastes are embedded, it is considered that low water content, i.e., below a few percent.

Silicate type rock will generally be suitable. For purposes herein, the term "silicate rock" may include igneous, metamorphic and sedimentary rocks characterized by a silica content of the order of 40 to 70%. Rocks which contain significant concentrations of carbonates, organic materials including hydrocarbons, petroleum, coal and the like which can produce non-condensible gases such as $CO_2$ when heated are less suitable.

It is generally preferred that the rock layer be at least twice as thick as the expected maximum melt diameter and preferably about 3 to 4 times as thick to suitably accommodate the molten zone at the greatest dimension. It is preferred that the selected strata be relatively deeply buried, e.g., 1000 to 4000 meters. A nuclear chimney of adequate size may usually be created using nuclear explosives having a yield in the range of about 1 to about 10 kilotons; the ultimate capacity of the nuclear chimney will usually be determined by the quantity of rock which will be melted and not by the initial size of the chimney. The chimney size, i.e., void space need only be sufficient to accommodate the dry bulk volume of accumulated waste. Larger size chimneys produced by larger yield devices, may of course be employed. With explosive yields of the magnitude indicated, wastes produced by a plant processing several tons, i.e., 1 to 10 tons or more per day of spent nuclear reactor fuel elements and stored.

While provision of a suitable rubble filled subterranean cavity or chimney by nuclear explosive means is disclosed, it may be noted that an equivalent structure provided by other means may likewise be employed. For example, an equivalent chamber may be constructed by mining or underground quarrying operations and the chamber filled with rubble by clock caving or back-filling procedures. The input and output conduits might be installed along a tunnel or shaft or provided by drililng methods as above with tunnels or shafts being sealed, e.g., with concrete plugs, etc. The rubble zone also provides the matrix material as it melts in earlier stages of phase 3 of the operation together with any wall material that may cave or melt. The rock adjacent to the cavity wall provides the additional material melted in later stages of phase 3.

More particularly, as shown in FIG. 1 of the drawing, an access well may be drilled in a suitable formation interval, of the character described and a nuclear device (not shown) may be emplaced and exploded at a shot point 13 therein. On detonation of the device, about 70 tons of silicate rock per kiloton of explosive yield is vaporized and a shock wave is propagated outwardly in all directions forming a detonation cavity, the generally spherical remnant bottom portion of which is shown in FIG. 1. The vaporized rock material expands outwardly until the cavity pressure equals the effective confining pressures at which time the cavity boundary has a radius Rc. After varying periods of time, i.e., a few minutes to several days, roof portions of the cavity collapse creating a generally cylindrical extension 15 of the cavity and together with remnant cavity portion 14, defining a nuclear chimney. The collapsing roof material creates a rubble zone 16 within the chimney. A fractured zone 17 surrounds the chimney. Comprehensive details of the conditions and effects relevant to detonation of buried nuclear explosives are given in Report UCRL-50929 (TID-4500 UC-35) entitled "Aids for Estimating Effects of Underground Nuclear Explosives" by T. R. Butkovich and A. E. Lewis, available from National Technical Information Center, Nat. Bur. of Stand., U.S. Dep't. of Commerce, Springfield, Va., 22151.

When temperatures in the nuclear chimney have equalized and pressure subsides, the chimney is adapted for operation of the waste disposal process by drililng a well bore provided with a casing 11 to establish communication with the void space in the upper portion of the chimney. Casing 11 may serve as a conduit for discharging effluent gases and vapors from the chimney. For example, such casing 11 may simply be connected directly to a discharge conduit 24 or to a wellhead facility 22 which may comprise pressure regulating means, shutoff valves, flow regulators, temperature sensing devices and the like somewhat as in the manner of "Christmas tree" wellhead facilities used in petroleum and geothermal power plant arrangement and thence to discharge conduit 24. Discharge conduit 24 may be used to conduct effluent vapor from facility 22 to an integrated fuel reprocessing and waste disposal facility 29 shown in the upper portion of FIG. 1. Moreover, a radioactive waste input or injection conduit may be provided in the form of a wellbore whipstocked to terminate in lower portions, i.e., intermediate lower sidewall or bottom portions of the chimney and fitted with a casing 27. While separate cased discharge and input wells are shown, other arrangements, such as a single well provided with concentric input and output conduits (not shown) may be used. With such an arrangement, i.e., when the input conduit is the annulus between the inner and outer casing, the high temperature steam emerging from the cavity is isolated from the formation and unfavorable effects such as steam formation exteriorly of the casing may be avoided. If the emplacement well can be rehabilitated or readapted, it may also serve as one of said well bores.

The surface facility 26 may include a spent reactor fuel reprocessing plant 29 or an equivalent facility adapted to prepare or produce fluidic wastes, i.e., aqueous solution or slurry forms of high level radioactive wastes in a manner similar to those used in conventional practice for discharge through a conduit 31.

The input conduit casing 27 may simply be connected to conduit 31 for injection of the wastes by gravity flow or through an appropriate wellhead facility 28, provided, e.g., with flow rate measuring means, shutoff valving and the like to an injection pump 32 and thence to conduit 31. The wastes are preferably introduced into lower portions of the chimney, i.e., preferably at a level of about 25% to about 75% below the top of the rubble zone.

The effluent vapor from conduit 24 is passed through a heat exchanger or condenser unit 36 wherein water vapor and other condensibles are condensed using cooling water obtained from a cooling tower or other means, e.g., a body of water (not shown). The condensate water may be discharged therefrom through a conduit 37 to enter a fission product removal facility 38, e.g., an ion exchange unit, wherefrom the water is conducted by a conduit 39 into reprocessing plant 29 to be used as process or makeup water. The fission products from facility 38, with adsorbent, etc., used therein may then be transferred by gravity flow or be pumped by a metering pump (not shown) through conduit 39 intermixed in relative proportions, discussed elsewhere herein, with the high level liquid wastes in conduit 31 for injection into the chimney by means of pump 32. Non-condensible materials discharged from plant 29, e.g., $133_{Xe}$, $85_{Kr}$, $3_H$, $131_I$, through conduit 41 as well as the non-condensibles discharged from condenser 36 through a conduit 42 may be transported to gas treatment facility 43 and treated for disposal, e.g., by injection into a nuclear chimney, underground strata, by adsorption or by other procedures such as those disclosed in ORNL-4451. Portions of the condensate from condenser 36 may be conducted directly by a conduit 44 for reinjection through conduit 31 (or 27) into the chimney.

Figure 2:
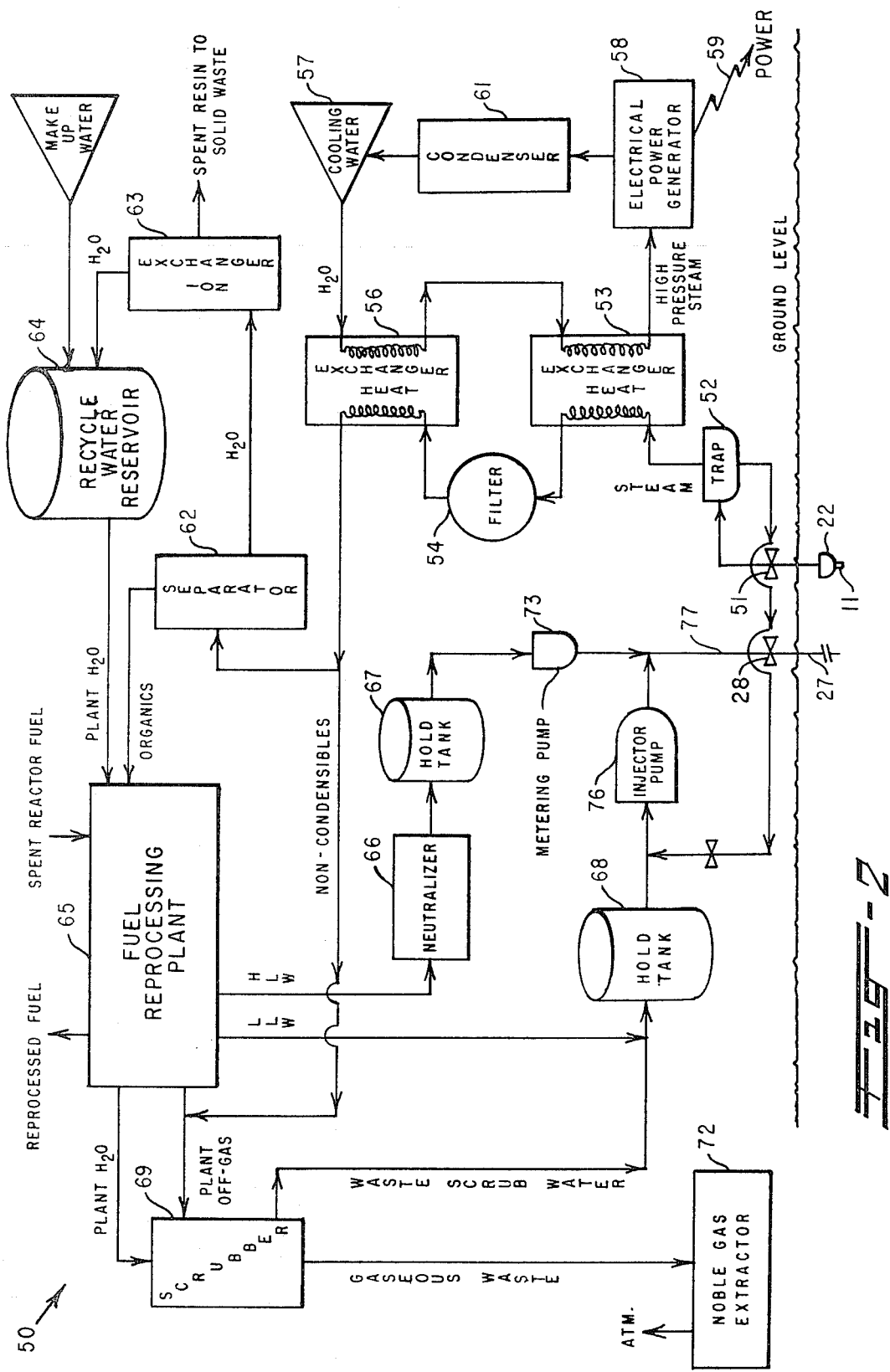
FIG. 2 is an illustration of a second embodiment of an accessory surface facility for use with the nuclear chimney of FIG. 1 in which electrical power may be generated.

It may be observed that the heat present in the chimney effluent may respresent a many megawatt source of energy. In the event that it is desired to employ this heat for the generation of electrical power, a somewhat more complex surface facility embodiment 50 as shown in FIG. 2 may be employed. Conduit 11 is therein coupled through wellhead facility 22 to pass the effluent vapors through a pressure regulator 51 to maintain the effluent vapor at a suitable working pressure. The effluent vapors are then passed through a trap 52 to remove any condensate therefrom and then successively through a superheater heat exchanger, an intermediate filter 54, to remove particulates, and a low temperature heat exchanger 56.

For generating electrical power, water from an appropriate source 57 is passed successively through the secondary portions of heat exchangers 56 and 53 to produce relatively high pressure or superheated steam which may then be utilized in a turboelectric generator 58 to generate power delivered to a transmission line 59. Condensate from the turbine condenser 61 may be pumped for recycle as coolant into source 57. Coolant for operating the condenser 61 may be supplied by a cooling tower or other source (not shown).

Following passage through heat exchanger 56 non-condensibles are separated from the turbine condensate which condensate may then be passed through a liquid-liquid extraction separator, e.g., a tributyl phosphate (TBP) extractor 62 and through an ion exchange column 63 to remove radioactive materials and then be discharged into a recycle water reservoir 64 for mixing with makeup water for use as plant water in fuel reprocessing plant 65 as above. Organic extractant containing radioactive wastes from extractor 62 may be included with wastes in plant 65 for reintroduction with spent resin or regenerant solution from ion exchange column 63 into the nuclear chimney. High level wastes (HLW) from plant 65 may be neutralized with $Ca(OH)_2$, $Mg(OH)_2$, NaOH, $NH_4OH$, etc., in a neutralizer unit 66 and stored temporarily in a hold tank 67. Also, a reductant such as formaldehyde, sugar, or the equivalent may be added to the wastes before introduction to the chimney to decompose the $HNO_3$ with consequent production of nitrogen oxides which may be recovered or treated for disposal. Low level wastes (LLW) may be likewise stored in a holding tank 68, provided with stirring means, if in the form of an aqueous slurry, to maintain the particulate in suspension, if necessary. Effluent plant off gas may be passed through a scrubber 69 to a noble radioactive gas extractor or absorber 72 for discharge to the atmosphere or for disposal otherwise as in conventional practice. Plant water, used as the scrubbing medium in scrubber 69 may be collected in holding tank 68. Non-condensibles, from heat exchanger 56 may be combined with plant off-gas for scrubbing in scrubber 69. Finally, high level wastes from tank 67 may be introduced by means of metering pump 73 in desired amounts to be admixed with low level wastes, intermediate level wastes if available and condensate from trap 52 delivered from injection pump 76 into a conduit 77. Conduit 77 is connected to input conduit 27 through a pressure regulator or control valve 78 and facility 28 if desired. The intermixed wastes or individual wastes as appropriate are injected therefrom into the chimney as above.

In commencing operation relatively undiluted high level waste material is injected through input conduit 27 from an appropriate surface facility, i.e., facility 26 or 50, to accumulate a sufficient volume of wastes therein so that the radioactive decay heat output raises the chamber contents to a desired operating temperature level. Time periods of the order of one to several months or more may be required for this first phase of the operation dependent on rate of injection which may be determined by the output rate of plants 26 or 50 or other factors.

Thenceforth, as a second phase of operation, the radioactive wastes and aqueous coolants are injected in amounts regulated to maintain the desired operating pressures and temperatures in the nuclear chimney. The fluidic wastes and coolants may be added continuously or in increments over selected periods of time. However, when full scale operation is attained, coolant water may be added substantially continuously to avoid formation of hot spots. These operating temperatures may range upwardly from about 100° C. as required to vaporize water at atmospheric pressure to as high as 300° C. Typical operating temperature for producing power may range from about 150° C. to about 300° C. It is usually preferred to maintain all of the radioactive wastes at a temperature below the melting point of the rubble zone 16 as by injecting sufficient cooling water or diluted fluidic wastes and regulating output pressure. This second phase of operation may be conducted over an extended period of time, for example, over time periods of 15 or more years to accommodate the progressive output of a fuel reprocessing plant. The span of time would ultimately be terminated as the accumulated residues fills the chimney to capacity as determined, e.g., by filling of the void spaces to ½ to ⅔ thereof or when the accumulated waste is adequate to melt an acceptable quantity of rock.

When it is desired to terminate operation, e.g., when the ultimate capacity is reached or for any other reason, a third phase of operation is initiated by terminating addition of high level waste. Low level waste and coolant injection may be continued for a somewhat larger period of time, for example, if continued generation of power is desired or to dissipate excessive heat and allow excessive amounts of radioactivity to decay. Injection of coolant and low level radioactive wastes is then terminated and the injection conduit closed whereupon the heat output of the accumulated wastes raises the temperature thereof and of the rubble zone progressively until the rubble zone, rock adjacent to the wells of crushed zone 17 and shear fracture zone 18 melt. Some caving of the chimney roof portions may also occur to add to the volume of molten material. During this period of time vaporous and gaseous effluents emerging from conduit 11 may be treated as above; however, power production is terminated as the output power diminishes beyond the economic point. During the drying out phase of operation metallic fission products will remain as oxides or salts which together with non-metallic fission products and other components of the wastes will be incorporated into the molten material in the chimney as magma-like solutions or as particulate dispersions when higher temperatures are attained.

Finally, as a fourth phase of operation, as the effluent output ceases conduit 11 can be closed off or conduits 11 and 27 may be stemmed, e.g., with concrete or the like. As the rate of radioactive output decreases due to diminishment of the radioactive species by radioactive decay, conduction of heat into the formation initiates progressive cooling inwardly from peripheral regions with a coincident solidification of the molten mixture of residual radioactive waste material with the silicate rock so as to permanently trap and store such interspersed wastes in an insoluble silicate rock matrix.

It may be noted that the foregoing procedure should provide adequate safeguards against release or leaching during operation or storage. In the event that water approaches the vicinity of the chimney, e.g., along fractures, the heat introduced into the formation would vaporize the water providing a "steam" barrier zone along which water cannot reach the melt. Otherwise, peripheral portions of the molten material would solidify, as described, also preventing leaching. Eventually, the entire mass would solidify.

In addition to the foregoing the procedure has the advantage of on-site disposal and eliminates hazards such as those associated with shipment of highly radioactive material. Moreover, the process provides for prompt disposal and for very low cost safe treatment of low and intermediate level radioactive waste and also provides a secure method of disposal safe from any possible effects of natural disasters such as tornadoes, earthquakes, floods and tidal waves. It would also be invulnerable to such man made hazards as sabotage, bombing or rocket attacks and guerilla warfare, the provision for a relatively simple method of decommissioning the waste storage facility requiring relatively little subsequent surveillance.

Further details of the operation of the process of the invention will be set forth in the following illustrative example:

EXAMPLE

For illustrative purposes, reference will be made to operation using light water reactor (LWR) and liquid metal cooled breeder reactor (LMBR) spent fuel wastes produced as in the Purex process and as disclosed above. The calculated thermal power of fission products and actinides in the wastes generated by the processing of light-water reactor (LWR) and liquid-metal-cooled fast breeder reactor (LMFBR) spent fuel is summarized in Table 3 hereinafter.

TABLE 3

[Summary of assumed characteristics of fuel reprocessing plants]

A. SPENT FUEL HISTORY

| | LWR | LMFBR |
|---|---|---|
| Reactor neutron flux (n./cm.$^2$ sec.) | $2.9 \times 10^{13}$ | $2.6 \times 10^{13}$ |
| Specific power (mw./ton) | 30 | 58 |
| Burnup (mwd./ton) | $3.3 \times 10^4$ | $3.3 \times 10^4$ |

B. GENERAL

| | Quantity per ton of fuel processed |
|---|---|
| Fission product isotopes | 35 kg. |
| Actinides | 5.8 kg. |
| Total | 40 kg. |
| Bulk volume of solidified dry wastes | 3.3 ft.$^3$ (0.092 m.$^3$). |
| Volume of liquid waste: | |
| High level waste | 400 gal. |
| Intermediate and low level waste | 10,000 gal. |

C. DECAY

| Reactor | Total curies | | | | | |
|---|---|---|---|---|---|---|
| LWR: | | | | | | |
| Post irradiation time (yr.) | 0.25 | 0.41 | 1.0 | 10 | 100 | 1,000 |
| Fission products | $6.2 \times 10^6$ | $4.4 \times 10^6$ | $2.2 \times 10^6$ | $3.2 \times 10^5$ | $3.4 \times 10^4$ | 21 |
| Actinides | $2.3 \times 10^4$ | $1.8 \times 10^4$ | $9.2 \times 10^3$ | $2.4 \times 10^3$ | $3.3 \times 10^2$ | 85 |
| LMFBR: | | | | | | |
| Post irradiation time (yr.) | 0.08 | 1.0 | 3.0 | 10 | 100 | 1,000 |
| Fission products | $2.0 \times 10^7$ | $3.4 \times 10^6$ | $1.0 \times 10^6$ | $2.8 \times 10^5$ | $3.1 \times 10^4$ | 25 |
| Actinides | $7.9 \times 10^4$ | $2.2 \times 10^4$ | $6.7 \times 10^3$ | $5.0 \times 10^3$ | $2.0 \times 10^3$ | $5.0 \times 10^2$ |

Note that most of the radioactivity, e.g., >99% will appear in the high level waste and the remainder in low and intermediate waste.

The radioactivity levels present in the wastes after passage of various period of time are summarized in Table 4 and the thermal energy in watts/ton in Table 5, infra.

TABLE 4

[Thermal power of significant fission products and actinides in the wastes generated by the processing of LWR [a] and LMFBR [b] spent fuel]

| | Watt/ton | | |
|---|---|---|---|
| Postirradiation time (yr.) | 1 | 10 | 100 |
| LWR fission product | $1.00 \times 10^4$ | $1.03 \times 10^3$ | $1.04 \times 10^2$ |
| LWR actinides | $3.15 \times 10^2$ | $7.06 \times 10^1$ | $1.01 \times 10^1$ |
| LWR total | $1.03 \times 10^4$ | $1.10 \times 10^3$ | $1.14 \times 10^3$ |
| LMFBR fission products | $1.38 \times 10^4$ | $7.66 \times 10^2$ | $8.72 \times 10^1$ |
| LMFBR actinides | $6.92 \times 10^2$ | $1.01 \times 10^2$ | $6.02 \times 10^1$ |
| LMFBR total | $1.45 \times 10^4$ | $8.67 \times 10^2$ | $1.47 \times 10^2$ |

[a] Light-water reactor fuel, having a burnup of 33,000 mwd./ton at a power of 30.00 mw./ton.
[b] Liquid-metal-cooled fast breeder reactor fuel, having a burnup of 32,997 mwd./ton at a power of 58.23 mw./ton.

Consideration of heat generation and transport within the chimney and the surrounding rock is essential for controlling operations of the process. Calculational consideration presented hereinafter were performed by R. L. Braun of the United States Atomic Energy Commission's Lawrence Radiation Laboratory site, Livermore, Calif.

Figure 3:
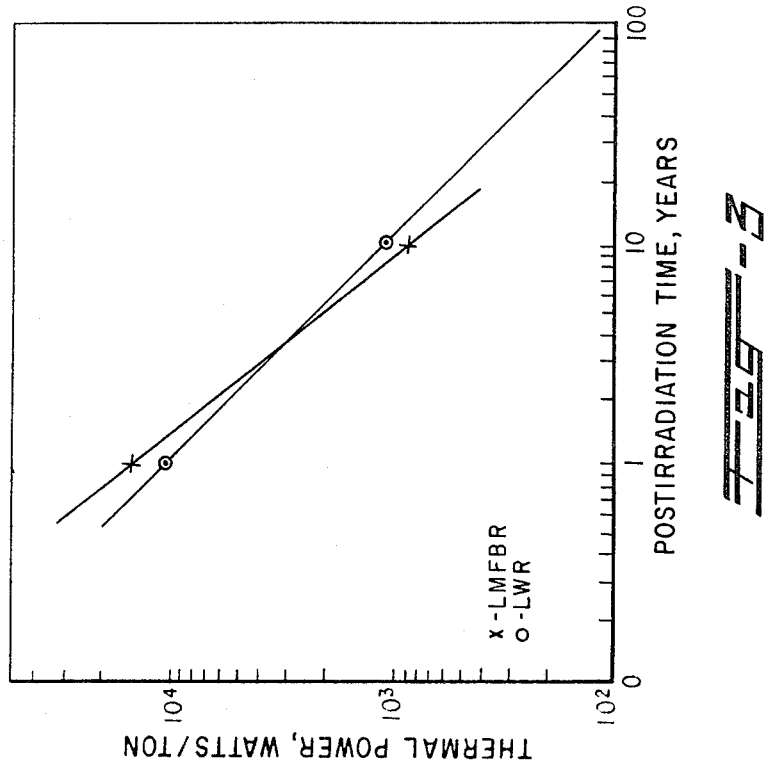
FIG. 3 is a graphical illustration of the thermal power generated in watts/ton for Light Water Reactor and Liquid Metal Cooled Fast Breeder Reactor radioactive wastes as a function of post-irradiation time.

Assume, for example, that the waste to be disposed of consists of equal amounts of LWR and LMFBR waste, then thermal decay can then be represented by the linear regression line shown in FIG. 3; namely, $$\dot{q} = \frac{\dot{q}_0}{t^1 + \alpha}$$

$\dot{q}$ = rate of heat production of processed fuel (watt/ton)
$\dot{q}_0 = 1.123 \times 10^4$ (watt/ton) (yr.)$^{1+\alpha}$
$\alpha = -.0125$ (for age 6 months → 100 yr.)

In estimating the thermal effects accompanying the underground disposal of these wastes, the rate Q (watt) of heat production by the radioactive waste in the chimney must be known as a function of time. In general, suppose that waste having heat output $\dot{q}$ (watt/ton) is added to the chimney at a rate of V (ton/yl.) for a duration of $t_d$ (yr.). Thereafter, waste addition is terminated or waste of a different strength is added at a different rate for another duration. This process can be continued for $n$ such phases of waste disposal. Analytically:

$$\dot{Q} = \sum_{i=1}^{n} \dot{Q}_i \qquad (2)$$

where $$\dot{Q}_j = \int_{t_o}^{t_o+t_j} \dot{V}_j \dot{q}_j dt - \int_{t_o}^{t_o+t_j-t_{dj}} \dot{V}_j \dot{q}_j dt = \int_{t_o+t_j-t_{dj}}^{t_o+t_j} \dot{V}_j \dot{q}_j dt \quad (3)$$

$Q_j$=contribution to the net rate of heat production in chimney due to waste added during phase $j$
$t_o$=age (yr.) of waste at time of disposal
$t_j$=total time (yr.) elapsed since start of phase $j$
$t_{dj}$=duration (yr.) of waste disposal of phase $j$.

The integrals of Equation 3 can be understood by the following considerations. The first integral would be the rate of heat production if waste were added during the entire time interval $t_j$. However, since waste is actually added only during $t_{dj}$, the rate of heat production from waste not added during the time interval $t_j-t_{dj}$ (second integral) must be subtracted to give the actual rate of heat production (third integral). The limits of the latter integral thus take into account that at an elapsed time $t_j$ since the start of phase $j$ of waste disposal, the age of the waste added during $t_j$ ranges from $t_o+t_j-t_{dj}$ to $t_o+t_j$. Substituting Equation 1 into Equation 3.

$$\dot{Q}_j = \int_{t_o+t_j-t_{dj}}^{t_o+t_j} \frac{\dot{V}_j \dot{q}_o}{t^{1+\alpha}} dt \quad (4)$$

For $\alpha \neq 0$, $$\dot{Q}_j = \frac{\dot{V}_j \dot{q}_o}{\alpha} \left( \frac{1}{(t_o+t_j-t_{dj})^\alpha} - \frac{1}{(t_o+t_j)^\alpha} \right) \quad (5)$$

For $\alpha = 0$, $$\dot{Q}_j = \dot{V}_j \dot{q}_o \ln \frac{t_o+t_j}{t_o+t_j-t_{dj}} \quad (6)$$

The following model is proposed for understanding the disposition of the heat generated in the chimney. The "primary" system at time $t_1$, is defined as a sphere of radius $r_1$ having a uniform temperature $T_1$ and containing a volume $V_{w,1}$ of water, a volume $V_{s,1}$ of chimney rubble immersed in water or water vapor, and a volume $V_{m,1}$ of molten rock. Knowing these properties at time $t_{1-1}$, we can calculate them at time $t_1 = t_{1-1} + \Delta t$. The assumption of sphericity is made to facilitate the calculation of heat transfer by thermal conductivity.

The latter calculation is based upon the following spatial zoning. Zone 1 is defined as a sphere of volume equivalent to the volume of chimney rubble. Other zones are defined as spherical shells of some prescribed thickness. The rate $P_{xy}$ (watt) of heat transfer between zones $x$ and $y$ is $$P_{xy} = -4\pi r_{xy}^2 K \left( \frac{dT}{dr} \right)_{xy} \quad (7)$$

where $r_{xy}$=radial distance from center of spherical system to $xy$ interface,
$dT/dr_{xy}$=temperature gradient at distance $r_{xy}$.

A computer code HEAT, based on Equations 2 and 7, performs the heat balance to calculate the new properties of the primary system for a prescribed temporal and spatial zoning for any desired scheme of waste disposal. Four distinct temperature regimes, and the transition between these regimes, are of interest; namely $T<100°$ C., $T=100°$ C., $100°$ $C.<T<T_f$, and $T=T_f$, where $T_f$=melting point of the rock.

(1) $T_{1-1}<100°$ C.

This primary system consists of the water added to the chimney during time $t_{1-1}$ and that portion of the chimney rubble immersed in water.

(2) $T_{1-1}=100°$ C.

This primary system consists of the water added to the chimney during time $t_{1-1}$ which has not yet vaporized and that portion of the chimney rubble immersed in water and water vapor. In these first two temperature regimes, it is assumed that there is not heat transfer by thermal conductivity into spatial zones outside the chimney until the primary system has grown to the size of zone 1.

(3) $100°$ $C.<T_{1-1}<T_f$

This primary system consists of the chimney rubble absorbing heat uniformly until the entire chimney is at the melting point.

(4) $T_{1-1}=T_f$

This primary system consists of the chimney rubble absorbing heat until all chimney rubble has melted. Thereafter, the primary system remains at the melting point and moves through consecutive zones to finish raising the temperature of the next zone to its melting point and then melting it. This process continues until the heat input to the primary system is balanced by the heat lost from it by thermal conductivity, whereupon cooling and solidification of the molten rock commences.

To illustrate the magnitude of the thermal effects associated with disposal of high-level radioactive wastes, the following representative properties are assumed.

Rock properties

Initial temperature: 50° C.
In-situ density: 2.7 g./cm.$^3$
Melting point: 1050° C.
Heat of fusion: 80 cal./g.
Specific heat: $0.216+9.60 \times 10^{-5}T-2.91 \times 10^3 T^{-2}$ ($T$ in ° K.) cal./g.-deg.
Thermal conductivity:
$6.30 \times 10^{-3} - 6.7 \times 10^{-6} T + 3.4 \times 10^{-9} T^2$ ($T$ in ° C.) cal./cm.-sec. deg.

Figure 4:
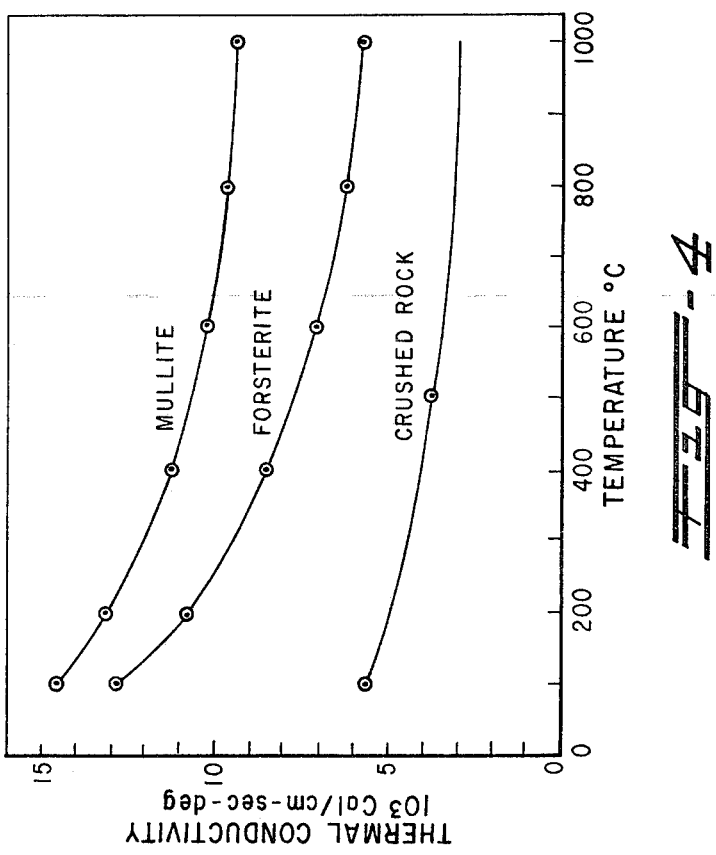
FIG. 4 is a graphical illustration of the variation in thermal conductivity of representative rock materials with variation in temperature.

The temperature dependence of thermal conductivity for silicate rock, extrapolated by analogy with other silicate for which such data are known, is shown in FIG. 4.

Assumed waste properties $V = 1500$ tons fuel/yr.$=y \times 10^5$ gal. water/yr.
$\dot{q}_o = 1.123 \times 10^4$ (watt/ton)yr.$^{1+\alpha} = 28.075$ (watt/gal.) yr.$^{1+\alpha}$
$\alpha = -0.0125$
$T_w = 99°$ C. (temperature of waste)

Chimney properties

The relevant data for 5, 10, and 30 kt. chimneys are shown in Table 5. These data were calculated by formulas of Butkovich and Lewis, using depth of burial=2000 m., water content of rock=2% wt. percent, scaling constant =100, and in-situ density=2.7 g./cm.$^3$.

TABLE 5.—CHIMNEY DATA
[Depth, 2,000 meters; Rock density, 2.7 gm./cm.$^3$; Water content, 2% by weight]

| Yield (kt.) | Radius of cavity (m.) | Volume of cavity ($10^3$ m.$^3$) | Bulking porosity | Mass of chimney rubble ($10^{10}$ g.) |
|---|---|---|---|---|
| 5 | 10.8 | 5.31 | 0.52 | 1.32 |
| 10 | 13.6 | 10.6 | 0.43 | 3.82 |
| 30 | 19.7 | 31.9 | 0.32 | 18.9 |

Calculationl results

Heat flow calculations were performed for various conditions. Results of a typical calculation are given in FIG. 5. This calculation assumed the following conditions:

(1) Chimney formed by 5 kt. explosive at 2000 meter depth (see Table 5). In rock layer at least 200 meters in thickness
(2) Age of waste=0.5 yr. (post irradiation time).
(3) Duration of waste addition=25 yr.
(4) Chimney temperatures kept <200° C. during waste addition.
(5) Waste and water addition terminated at 25 yr.

Figure 6:
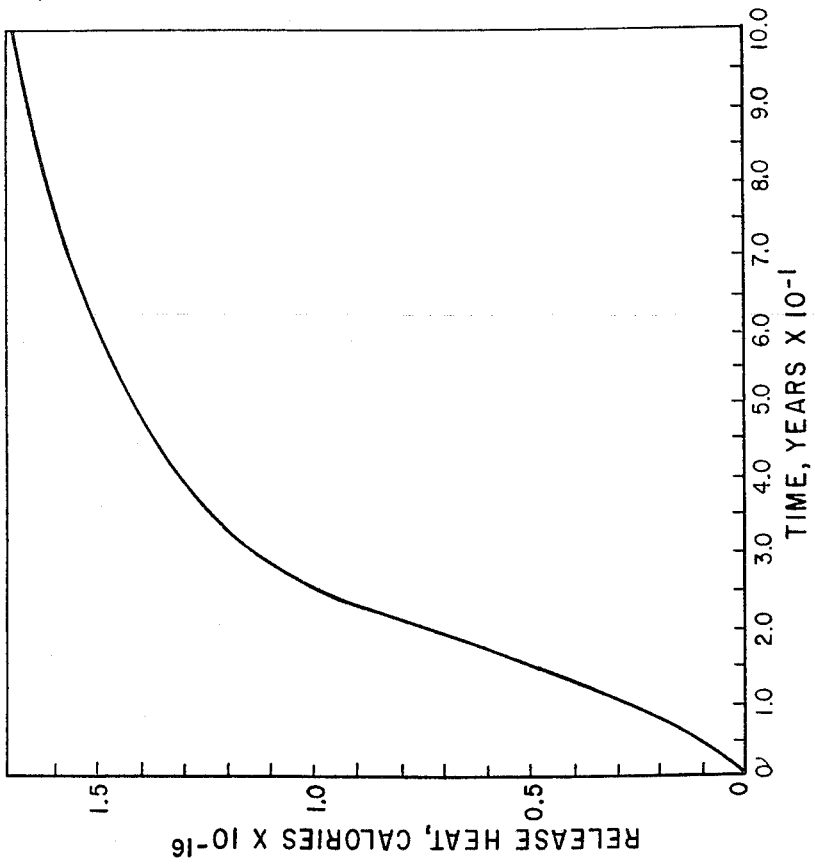
FIG. 6 is a graphical illustration of the heat energy output in calories for radioactive wastes disposed in a nuclear chimney as in FIG. 6.
Figure 5:
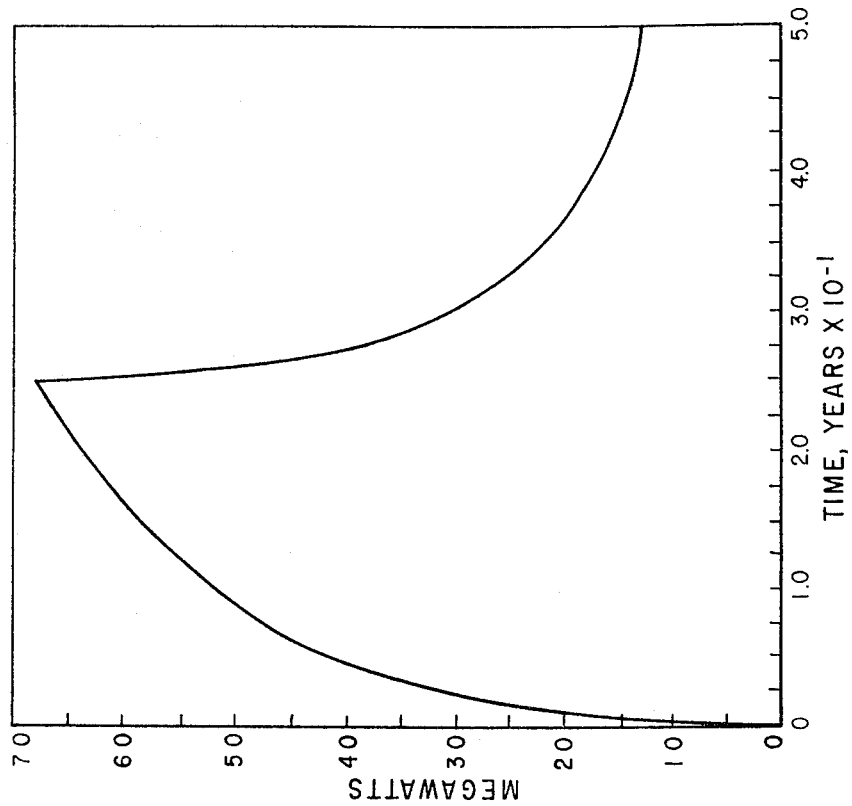
FIG. 5 is a graphical illustration of the power output in watts for radioactive waste aged for 0.5 year and then introduced into a 5 kilton chimney.
Figure 8:
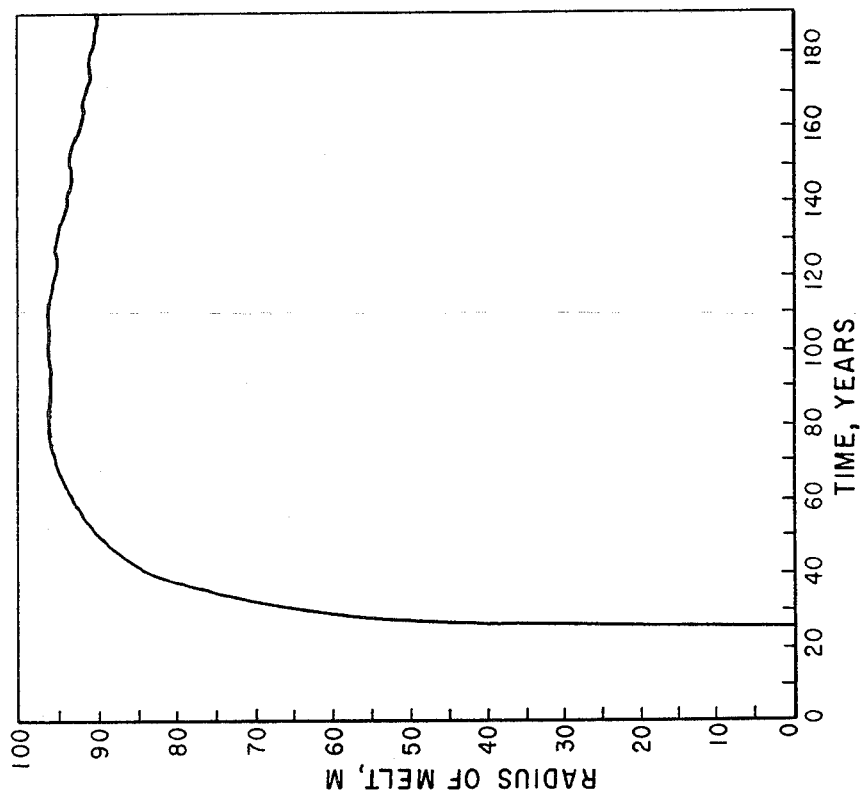
FIG. 8 is a graphical illustration of the relation of the melt radius with respect to time.
Figure 7:
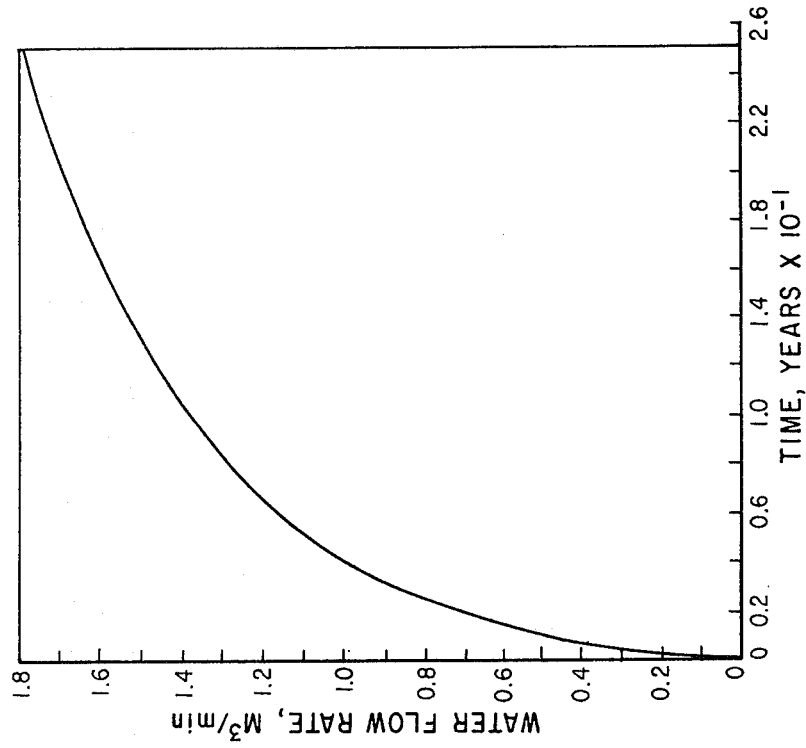
FIG. 7 is a graphical illustration of the rate of addition of coolant water required to cool radioactive wastes in a 5 kiloton chimney over a 25 year time period.

The properties of the system were calculated at increments of 0.01 yr., using 1 meter spatial zoning beyond the chimney. FIG. 5 shows the rate of heat production as a function of time peaking at ~67 mw. FIG. 6 gives total heat production reaching ~$1.7 \times 10^{16}$ calories at 100 years. FIG. 7 indicates the required rate of cooling water addition reaching a maximum of ~1.80 m.$^3$/min. at the 25 year cutoff. FIG. 8 gives the radius of the molten rock mass as a function of time reaching a maximum of 96 meters at 90 years.

Table 6 gives some further calculational results. These indicate that neither required cooling water, nor rock melting rates are significantly affected by chimney size or the assumption of one year old instead of half year old waste.

Other calculations performed with different spatial zonings (0.5 and 3.0 meters) and for controlled chimney temperature of 100° C. indicate that these changes also have little effect on the overall phenomenology. Table 7 gives the effects due to variation in assumed thermal properties of the rock. It is interesting to note from these data that changes in thermal conductivity alter the times at which maximum melting occurs but do not significantly affect the total mass of melted rock, at least under the conditions assumed for these calculations.

TABLE 7

Effects of variation in thermal properties of rock for disposal of 0.5-year-old waste in a 5 kt. chimney [a]

| Heat of fusion (cal./g.) | Thermal conductivity (cal./cm.-sec.-deg.) | Specific heat (cal./g.-deg.) | Molten rock maximum Time (yr.) | Radius (m.) |
|---|---|---|---|---|
| 80 | (b) | (b) | 90 | 96 |
| 80 | $6 \times 10^{-3}$ | 0.23 | 68 | 92 |
| 60 | $6 \times 10^{-3}$ | 0.23 | 66 | 93 |

[a] Cooling water added at variable rate necessary to maintain chimney temperature at 200° C. during 25-year period of waste addition.
[b] Temperature-dependent functions (see Figure 4).

The chimney capacity would be determined by the dry bulk volume of the waste and the storage volume of the chimney. Assuming a 5 kt. yield chimney, as in Table 5, at an allowable storage of 75% of maximum capacity, ~4000 m.$^3$ would be available. With a 3.3 ft.$^3$ (0.093 m.$^3$) dry bulk volume of waste per ton of fuel (Table 2), over 42,000 tons of fuel could be processed before capacity is reached. This would allow for 28 years of operation at a rate of 1500 tons/yr. With pre-neutralizaion, the dry bulk volume would be increased by an amount dependent on the method used. Some processes for elimination of $HNO_3$ would include addition of alkali or organic reductants such as sugar of formaldehyde. Any increase in bulk volume could be accommodated by increasing the size of the chimney or by periodically allowing the chimney temperature to rise enough to decompose the nitrates, thereby decreasing the volume of solid in the chimney. The decomposition products, principally nitrogen oxides, are then to be processed at the surface for use or disposal. Casing of sufficiently large diameter to assure a low pressure drop therein is employed to assure that the cavity pressure and attendant temperature do not rise sufficiently to volatlize undue amounts of fission products.

While there has been described in the foregoing what may be considered to be preferred embodiments of the invention, modifications may be made therein within ordinary skill of the art or without departing from the teachings of the invention and it is intended to cover all such modifications as fall within the scope of the appended claims.

What we claim is:

1. In a process for disposing of fluidic radioactive wastes, the steps comprising:

providing a cavity having a rubble zone therein in a relatively thick insoluble impervious subterranean silicate rock formation, said cavity having input and output conduit means;

introducing portions of said fluidic wastes through said input conduit into lower portions rubble zone to accumulate a quantity thereof providing a radioactive heat output from radioactive wastes therein sufficient to increase the temperature of the chimney contents to a selected operating temperature;

introducing additional portions of said radioactive waste progressively over a period of time together with coolant water in quantities regulated to maintain the chimney contents at said operating temperature, said coolant water vaporizing at said operating temperature and being discharged as effluent vapor through said cavity discharge conduit away from radioactive wastes which accumulate in the interstices of said rubble zone; and terminating introduction of said radioactive wastes and coolant water at a time when a sufficient quantity thereof has been accumulated to assure melting of at least the chimney rubble zone and radioactive wastes by radioactive heat output of the accumulated radioactive wastes in the absence of coolant water, so that at least the chimney contents including the radioactive wastes and rubble zone are fused into a molten mixture disposed in said cavity, said molten mixture eventually solidifying to trap said radioactive wastes in an insoluble solid silicate rock matrix.

2. A process as defined in claim 1 wherein said radioactive wastes comprise a fluidic aqueous solution or slurry form of high level radioactive wastes derived by reprocessing spent nuclear reactor fuel elements and said cavity is provided by emplacing and detonating a nuclear explosive device at a shot point in said formation interval, wherefor said cavity comprises a nuclear chimney and said rubble zone comprises fragmented formation rock rubble.

3. A process as defined in claim 2 wherein said fluidic radioactive waste also comprises intermediate and low level nuclear reactor fuel wastes as a separate entity and wherein such intermediate and low level wastes are introduced together with said coolant water into said nuclear chimney rubble zone.

4. A process as defined in claim 2 wherein the effluent aqueous vapor emerging from said cavity discharge coolant, wherein water is condensed from non-condensibles in said effluent, said condensed water containing radioactive contaminants, wherein the condensed water is recycled as coolant water, and wherein the non-condensible effluent vapor portions are processed for disposal.

5. A process as defined in claim 3 wherein said high level radioactive wastes are derived by reprocessing spent fuel elements having been stored from about three months to about one year after withdrawal from the nuclear reactor.

6. A process as defined in claim 2 wherein said nuclear explosive device has an explosive yield in the range of about 1 kiloton to about 100 kilotons and the depth of emplacement is in the range of about 1000 to about 3500 meters.

7. A process as defined in claim 2 wherein the effluent vapor from the discharge coolant is passed through the primary circuit of a heat exchanger to heat a heat exchange medium in the secondary circuit thereof so as to be cooled and emerge as condensate, wherein the condensate is separated from non-condensibles and is then recycled process or coolant water, wherein said radioactive wastes are produced in a reprocessing plant using said condensate as a fluidizing medium and emerging in part as low level, fluidic waste and in part as high level fluidic waste, and wherein said low level waste is injected as said coolant with said high level wastes into said chimney.

8. A process as defined in claim 6 wherein said nuclear device has an explosive yield in the range of about 5 to 10 kilotons and said reactor wastes comprise a material selected from the groups LWR and LMFBR wastes stored for a period of from about 0.25 to 1.0 years.

9. A process as defined in claim 7 wherein said high level waste comprises an acidic aqueous solution of high level waste and wherein said acidic solution is neutralized by addition of a basic substance before injection into said cavity.

10. A process as defined in claim 7 wherein said heat exchange medium is employed to produce steam for electrical power generation.

11. A process as defined in claim 7 wherein said wastes comprise a nitric acid solution and wherein nitric acid is volatilized and is recovered from the effluent vapor.

References Cited

UNITED STATES PATENTS

| | | | |
|---|---|---|---|
| 3,236,053 | 2/1966 | Billue | 66—.5 |
| 3,613,378 | 10/1971 | Dunlap et al. | 66—.5 |
| 3,262,274 | 7/1966 | Nelson, Jr. | 66—.5 |

REUBEN EPSTEIN, Primary Examiner

U.S. Cl. X.R.

61—.5; 60—203; 166—247